United States Patent
Rech et al.

(10) Patent No.: US 11,532,185 B2
(45) Date of Patent: Dec. 20, 2022

(54) METHOD FOR A DATA PROCESSING SYSTEM FOR MAINTAINING AN OPERATING STATE OF A FIRST AUTONOMOUS VEHICLE AND METHOD FOR A DATA PROCESSING SYSTEM FOR MANAGING A PLURALITY OF AUTONOMOUS VEHICLES

(71) Applicant: VOLKSWAGEN AG, Wolfsburg (DE)

(72) Inventors: Bernd Rech, Bokensdorf (DE); Stefan Gläser, Braunschweig (DE); Monique Engel, Braunschweig (DE); Hendrik-Jörn Günther, Troy, MI (US); Teodor Buburuzan, Braunschweig (DE); Sandra Kleinau, Rötgesbüttel (DE); Bernd Lehmann, Wolfsburg (DE); Johannes Hartog, Braunschweig (DE)

(73) Assignee: Volkswagen AG

( * ) Notice: Subject to any disclaimer, the term of this patent is extended or adjusted under 35 U.S.C. 154(b) by 373 days.

(21) Appl. No.: 16/781,016

(22) Filed: Feb. 4, 2020

(65) Prior Publication Data
US 2020/0175785 A1 Jun. 4, 2020

Related U.S. Application Data

(63) Continuation of application No. 15/706,880, filed on Sep. 18, 2017, now Pat. No. 10,607,422.

(30) Foreign Application Priority Data

Sep. 20, 2016 (DE) ............... 10 2016 218 012.6

(51) Int. Cl.
*G07C 5/00* (2006.01)
*G06Q 10/00* (2012.01)
(Continued)

(52) U.S. Cl.
CPC ......... *G07C 5/008* (2013.01); *G01C 21/3415* (2013.01); *G05D 1/0027* (2013.01);
(Continued)

(58) Field of Classification Search
CPC .. G07C 5/008; G01C 21/3415; G05D 1/0027; G05D 1/0088; G05D 1/0291;
(Continued)

(56) References Cited

U.S. PATENT DOCUMENTS 8,352,112 B2    1/2013  Mudalige
2009/0231429 A1*  9/2009  Hardee ............ G08G 1/096716
                                                    348/148

(Continued)

FOREIGN PATENT DOCUMENTS

DE    102007010867 A1    9/2008
DE    102012017497 B3    12/2013
(Continued)

*Primary Examiner* — Nga X Nguyen
(74) *Attorney, Agent, or Firm* — Barnes & Thornburg, LLP

(57) ABSTRACT

A method for a data processing installation for obtaining an operating state of a first autonomous vehicle. The method includes determining a current state of the first autonomous vehicle from a received measurement value of a sensor of a second vehicle. When the current state of the first autonomous vehicle deviates from a setpoint state, the method includes sending a first message to the first autonomous vehicle, wherein the first message contains a command to travel autonomously to a service location. Alternatively, the method includes sending a second message to a person responsible for the first autonomous vehicle, wherein the second message includes information about the deviation of the current state of the first autonomous vehicle from the setpoint state. Alternatively, the method includes sending a third message to service personnel, wherein the third mes-
(Continued)

sage contains an instruction for the service personnel to set the vehicle to the setpoint state.

26 Claims, 3 Drawing Sheets

(51) Int. Cl.
 *G05D 1/02* (2020.01)
 *G05D 1/00* (2006.01)
 *G01C 21/34* (2006.01)
(52) U.S. Cl.
 CPC ......... *G05D 1/0088* (2013.01); *G05D 1/0291* (2013.01); *G06Q 10/00* (2013.01); *G06Q 10/20* (2013.01); *G05D 2201/0213* (2013.01)
(58) Field of Classification Search
 CPC ........... G05D 2201/0213; G06Q 10/00; G06Q 10/20; B60S 3/00
 See application file for complete search history.

(56) References Cited

U.S. PATENT DOCUMENTS

| | | | |
|---|---|---|---|
| 2012/0083960 A1* | 4/2012 | Zhu | G06Q 30/0207 |
| | | | 701/23 |
| 2014/0052312 A1 | 2/2014 | Stadler | |
| 2015/0339928 A1 | 11/2015 | Ramanujam | |
| 2015/0348335 A1 | 12/2015 | Ramanujam | |
| 2017/0147959 A1* | 5/2017 | Sweeney | G06Q 10/063114 |
| 2017/0278312 A1* | 9/2017 | Minster | G05D 1/0297 |
| 2018/0143035 A1 | 5/2018 | Ricci | |
| 2018/0240288 A1* | 8/2018 | Samper | G07C 5/008 |

FOREIGN PATENT DOCUMENTS

| | | |
|---|---|---|
| DE | 102014224792 A1 | 6/2016 |
| WO | 2015057979 A1 | 4/2015 |

* cited by examiner

METHOD FOR A DATA PROCESSING SYSTEM FOR MAINTAINING AN OPERATING STATE OF A FIRST AUTONOMOUS VEHICLE AND METHOD FOR A DATA PROCESSING SYSTEM FOR MANAGING A PLURALITY OF AUTONOMOUS VEHICLES

PRIORITY CLAIM

This patent application is a continuation of U.S. patent application Ser. No. 15/706,880, filed 18 Sep. 2017, which claims priority to German Patent Application No. 10 2016 218 012.6, filed 20 Sep. 2016, the disclosures of which are incorporated herein by reference in their entireties.

SUMMARY

Illustrative embodiments relate to obtaining an operating state of a vehicle. Illustrative embodiments relate to a method for a data processing installation for obtaining an operating state of a first autonomous vehicle. Illustrative embodiments further relate to a method for a data processing installation for managing a plurality of autonomous vehicles.

BRIEF DESCRIPTION OF THE DRAWINGS

Exemplary embodiments are explained in more detail below with reference to the appended figures, in which.

DETAILED DESCRIPTION

Figure 1:
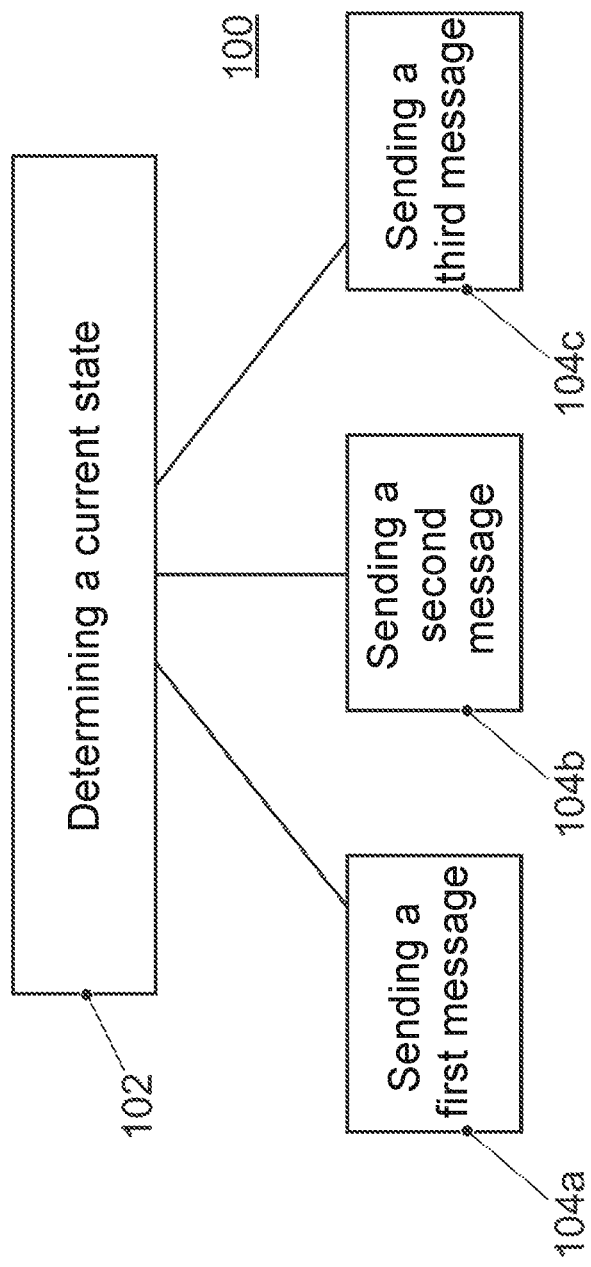
FIG. 1 shows a flowchart of an exemplary embodiment of a method for a data processing installation for obtaining an operating state of a first autonomous vehicle.

A vehicle is a mobile mode of transport for transporting people or goods. The vehicle can therefore be both a passenger vehicle and a commercial vehicle. For example, a vehicle can be an automobile, a truck, a motorcycle or a tractor. In general, a vehicle can be understood as a device that comprises an engine, a drive train system and wheels.

Vehicles in a sharing network are used by varying users. After being used by the user, a vehicle in a sharing network is parked in a public area and is subsequently available for further users.

With the progression of autonomous driving, that is to say the vehicle traveling autonomously in public road traffic, driverless taxis or rental vehicles will also join public road traffic in the future.

In doing so, it may be that the vehicles, for example, become dirty or damaged or individual components of the vehicle wear out. This can occur to such an extent that the vehicle no longer satisfies the quality requirement of a supplier of the vehicle. Until now, taxis have been cleaned and maintained by the vehicle driver and rental vehicles have been cleaned and maintained by service personnel at rental offices. However, in the case of autonomously driving vehicles, there is no taxi driver and only very few rental offices with service personnel. Service stations of a supplier can therefore be located relatively far away from a current location of the vehicle, with the result that there can be long journey distances and/or journey times to a service station. The vehicle cannot be used by users during these times.

The document US 2009/0231429 A1 proposes a method in which, in the vehicle, a recording is compared with stored recordings and the driver is notified when a problem is identified. However, this requires participating vehicles to have appropriate evaluation capacities available in them. The document US 2009/0231429 A1 does not, therefore, provide a solution for efficiently maintaining an operating state of a vehicle.

The document US 2015/0348335 A1 proposes a method in which a vehicle identifies that a service is required and travels independently to a service center. Here, too, the vehicles are again required to have appropriate evaluation capacities available in them. The document US 2015/0348335 A1 does not, therefore, provide a solution for efficiently maintaining an operating state of a vehicle either.

The document US 2014/0052312 A1 proposes a method for autonomous driving in a car wash facility. The document US 2014/0052312 A1 does not, however, provide a solution for efficiently maintaining an operating state of a vehicle either.

The document DE 10 2014 224 792 A1 proposes a method for identifying vehicle damage. Here, a first vehicle scans a second vehicle and identifies a defect on the second vehicle. In this case, the evaluation of the scan is carried out in the first vehicle. This therefore requires participating vehicles to have appropriate evaluation capacities available in them. The document DE 10 2014 224 792 A1 does not, therefore, provide a solution for efficiently maintaining an operating state of a vehicle.

There is therefore a demand for providing a possibility of maintaining an operating state of an autonomous vehicle in the most efficient manner possible, that is to say in the most timely and cost-effective manner possible.

The present disclosure makes this possible by a method for a central data processing installation for obtaining an operating state of a first autonomous vehicle. In this case, the method comprises determining a current vehicle state of the first autonomous vehicle from a received measurement value of a sensor of a second vehicle. The measurement value of the sensor can be a recording from a camera, for example. It is therefore possible to use, for example, a camera (for recording static or moving images) fitted in or on the second vehicle. It is therefore possible to make recordings of the exterior and/or the interior of the first autonomous vehicle. The measurement value can be sent from the second vehicle to the data processing installation, for example, by cellular communication or by a local wireless network (for example, in accordance with the standard IEEE 802.11 of the Institute of Electrical and Electronics Engineers, in particular with the standard IEEE 802.11p for communication between the second vehicle and a traffic infrastructure—such as a traffic light system). A current vehicle state can be determined by automated (that is to say computer-assisted) evaluation of the recording. For this purpose, known image recognition methods can be used, for example. It is thus possible to determine, for example, whether the first autonomous vehicle is soiled or dirty on the inside or outside. In this way, it is also possible to identify damage on the vehicle (for example, a crack in the windscreen, dents in the trim, scratches on the paint). However, the measurement value is not restricted to recordings from a camera. Instead, the measurement value can be the value of any desired measurement variable that is provided by a measurement appliance or a measurement device (for example, ultrasound sensor, laser scanner, radar) in or on the second vehicle.

Only computation power of the data processing installation has to be made available by the central evaluation process. No further computation power has to be made available in the vehicles themselves for the evaluation of the measurement values of the sensor. Moreover, it is sufficient, for example, for updates to software for evaluating the measurement value, that is to say software for determining the current state of the first autonomous vehicle, to be installed only centrally in the data processing installation. Deployment in the vehicles is not necessary.

The current state of the first autonomous vehicle is therefore known from the evaluation of the measurement value of the sensor of the second vehicle. The current state of the first autonomous vehicle can indicate a state that allows or else does not allow a further operation of the first autonomous vehicle. In other words: the current state of the first autonomous vehicle indicates whether the vehicle is in an operating state or not. When the current vehicle state deviates from a setpoint state, the method therefore comprises sending a first message to the first autonomous vehicle. In this case, the first message contains a command to travel autonomously to a service location. The setpoint state indicates here a state that allows a further operation of the vehicle and satisfies a quality requirement of a supplier of the vehicle. In other words: the vehicle is in the operating state when its current state corresponds to the setpoint state. If the current vehicle state now deviates from the setpoint state because, for example, the vehicle is excessively dirty or a component of the vehicle is worn and/or faulty, the first autonomous vehicle can travel autonomously in public traffic to the service location, to be examined in more detail or to be set back to the setpoint state there. The service location can be, for example, a workshop, a car wash facility or another location at which the first autonomous vehicle can be examined or set to the setpoint state (for example, cleaning or repairing). In this case, the work on the first autonomous vehicle can be carried out both by service personnel (that is to say a person) and by an automatically working device (for example, automatic cleaning). Consequently, after a deviation from the setpoint state has been identified, repair of the first autonomous vehicle can be initiated.

In accordance with some exemplary embodiments, the measurement value of the sensor of the second vehicle is a recording from a camera (for example, a static image or a sequence of moving images). Cameras are already installed in many vehicles having driving assistance systems and vehicles having autonomous driving systems. Consequently, the disclosed method can draw on hardware already present in the second vehicle. The incorporation of further hardware into the second vehicle can therefore be avoided. Only updating of the vehicle software is required. Costs can thus be avoided.

In some exemplary embodiments, the determination of the current state of the first autonomous vehicle is further based on a measurement value of a sensor of a third vehicle. In other words: sensor measurement values of a plurality of vehicles can be used for the determination of the current state of the first autonomous vehicle. If the measurement value is, for example, the recording from a camera, it may be, inter alia, that the second vehicle only makes a recording of the left vehicle side. To be able to better determine the current state of the first autonomous vehicle, it is now possible, for example, to furthermore use a recording of the right vehicle side of the first autonomous vehicle by the third vehicle. It is also possible to use additional recordings from further vehicles, for example, of the rear or the front of the first autonomous vehicle for the determination of the current state of the first autonomous vehicle. It is also possible for some vehicle parts to appear redundantly, that is to say multiple times, in the recordings of the first autonomous vehicle, as a result of which improved analysis of the vehicle parts can be made possible on account of the better availability of data.

In accordance with some exemplary embodiments, the method further comprises determining a service time based on a planned future use of the first autonomous vehicle. In this case, the first message comprises information about the service time. The planned future use of the first autonomous vehicle can be, for example, already planned journeys of the first autonomous vehicle. For example, in the case of driverless taxis (which are also known under the designation robot taxis), future journeys of the vehicle can be planned already. If the planned future use of the first autonomous vehicle is included in the determination of the service time, it can be ensured that, on the one hand, the first autonomous vehicle is set to the setpoint state and, on the other hand, the future use of the first autonomous vehicle as planned is possible. Based on the above example of a driverless taxi, the service time can be placed, for example, between two planned journeys or at a time after all already planned journeys have ended. The first autonomous vehicle can, for example, calculate a route for itself by way of the information about the service time in the first message, to travel promptly from its current or a future position to the service location.

In some exemplary embodiments, the service location is a service station, that is to say a company premises at which one or more services are offered or carried out for the first autonomous vehicle. The service station can be a workshop, a filling station or a car wash facility, for example. Here, the disclosed method further comprises selecting the service station from a plurality of service stations based on a position of the first autonomous vehicle. The position of the first autonomous vehicle can be, for example, a current position of the first autonomous vehicle and can be determined, for example, by a global navigation satellite system, such as global positioning system (GPS), Galileo, global navigation satellite system (GLONASS) or Beidou. However, the position of the first autonomous vehicle can also be a future position of the first autonomous vehicle and can be known, for example, from a planned future use of the first autonomous vehicle (for example, a destination of a planned future journey). It is possible to avoid long distances between the vehicle and the service station by selecting the service station on the basis of the position of the first autonomous vehicle. Correspondingly, work can begin on the first autonomous vehicle within a short space of time.

In accordance with some exemplary embodiments, the second vehicle is also an autonomous vehicle. That is to say that the second vehicle can also travel autonomously in public road traffic. In this case, the disclosed method further comprises determining a journey trajectory for the second autonomous vehicle based on a position of the first autonomous vehicle, wherein the position of the first autonomous vehicle relative to the journey trajectory satisfies a prescribed quality criterion. The method further comprises sending a fourth message to the second autonomous vehicle, wherein the fourth message contains information about the journey trajectory and a command to travel along the journey trajectory and in the process to send recorded measurement values of the sensor to the data processing installation. The position of the first autonomous vehicle can again be the current position of the vehicle as well as a future position of the first autonomous vehicle. The journey trajectory is a trajectory to be driven along by the second autonomous vehicle, that is to say a time-dependent progression of the position of the second autonomous vehicle. By determining the journey trajectory for the second autonomous vehicle, a quality of the measurement of the first autonomous vehicle by the second autonomous vehicle can be prescribed. It is therefore possible to ensure, for example, an orientation of the second autonomous vehicle relative to the first autonomous vehicle for the measurement of the first autonomous vehicle. The quality criterion is a parameter that ensures the quality and completeness of the measurement values of the sensor of the second autonomous vehicle. If, for example, the image recordings are image recordings of the first autonomous vehicle by the second autonomous vehicle, a suitable distance between the vehicles or a complete visibility of the first autonomous vehicle in the image recording can be ensured, for example, by the journey trajectory in accordance with the quality criterion. However, external parameters, such as the illumination situation, can also be taken into account in the quality criterion. In this way, the journey trajectory can have, for example, a specific relative orientation to a position of the sun or a specific time for driving along the trajectory can be determined. For example, a quality of the illumination of the setting to be recorded can be ensured in such a way. The sensor measurement values obtained in this way can be sent to the data processing installation, for example, by a cellular network or a local wireless network (for example, by transmission in accordance with the standard IEEE 802.11p to a corresponding traffic infrastructure). The second autonomous vehicle can therefore be moved in a targeted manner relative to the first autonomous vehicle by the fourth message, to enable a qualitatively sufficient or satisfactory measurement of the first autonomous vehicle.

Conversely, in some exemplary embodiments, the method can also comprise determining a journey trajectory for the first autonomous vehicle based on a position of the second vehicle, wherein the position of the second vehicle relative to the journey trajectory satisfies a prescribed quality criterion. Furthermore, the method can then comprise sending a message to the first autonomous vehicle, wherein the message contains a command to travel along the journey trajectory. The first autonomous vehicle can therefore be moved on a defined trajectory relative to the second vehicle. This may be beneficial, for example, when the second vehicle is parked. It is also possible for the two vehicles to travel simultaneously toward one another on defined journey trajectories in this way. A quality of the measurement of the first autonomous vehicle by the second vehicle can be ensured in this way by a targeted travel of the first autonomous vehicle relative to the second vehicle.

In accordance with some exemplary embodiments, the second vehicle is again an autonomous vehicle. In this case, the disclosed method further comprises determining a journey route for the second autonomous vehicle based on a position of the first autonomous vehicle, wherein the journey route leads past the position of the first autonomous vehicle. The position of the first autonomous vehicle can again be a current or a future position of the first autonomous vehicle. The journey route is a prescribed pathway between two positions. In contrast to the journey trajectory, the journey route is not, however, a trajectory to be traveled along, that is to say is not a time-dependent progression of the position of the second autonomous vehicle, but is an indication to travel independently along a number of prescribed waypoints from a start position to a target position. For example, the journey route can prescribe a pathway from a start position to a target position, the pathway leading along a specific road in which the first autonomous vehicle is located. The pathfinding along the journey route is the responsibility of the second autonomous vehicle itself, however. The disclosed method therefore further comprises sending a fifth message to the second autonomous vehicle, wherein the fifth message contains information about the journey route and a command to travel autonomously along the journey route and to send measurement values of the sensor recorded within a prescribed radius around the position of the first autonomous vehicle to the data processing installation. A targeted driving of the second autonomous vehicle past the first autonomous vehicle can be controlled in this way, to cause the first autonomous vehicle to be measured in a targeted manner by the second autonomous vehicle.

Conversely, in some exemplary embodiments, the method can therefore also comprise determining a journey route for the first autonomous vehicle based on a position of the second vehicle, wherein the journey route leads past the position of the second vehicle. In this case, the method can further comprise sending a sixth message to the first autonomous vehicle, wherein the sixth message contains information about the journey route and a command to travel autonomously along the journey route. In this way, a targeted driving of the first autonomous vehicle past the second vehicle can be arranged. This may be beneficial, for example, when the second vehicle is parked. The two vehicles can also be commanded to drive past one another. The second vehicle can then measure the first autonomous vehicle driving past (for example, make one or more image recordings). For this purpose, for example, a seventh message, containing the command to send recorded measurement values of the sensor to the data processing installation, can be sent to the second vehicle as soon as the first autonomous vehicle is traveling along the journey route within a prescribed radius around the position of the second vehicle. Consequently, a targeted measurement of the first autonomous vehicle can be controlled by the second vehicle.

In accordance with some exemplary embodiments, the method further comprises assigning a received measurement value of the sensor of the second vehicle to the first autonomous vehicle. The second vehicle often does not know which further vehicle it is measuring or recording. To keep the hardware and software outlay for carrying out the disclosed method low in the vehicle, assignment in the data processing installation is therefore suggested. In this way, the received measurement value can be assigned to the first autonomous vehicle in the case of an image recording, for example, by an indicator of the first autonomous vehicle contained in the image recording. As an alternative, the received measurement value can also be assigned to the first autonomous vehicle, for example, by known positions of the first autonomous vehicle and the second vehicle at the time of generation of the measurement value by the sensor. In this way, it is also possible for measurement values generated by sensors of various vehicles to be assigned to the first autonomous vehicle. Consequently, it is possible to provide a wider database for determining the current state of the first autonomous vehicle.

To organize the repair of autonomous vehicles efficiently, the disclosed embodiments provide a method for a data processing installation for managing a plurality of autonomous vehicles. In this case, the method comprises receiving information about a deviation of a current vehicle state from a setpoint state for at least a portion of the plurality of autonomous vehicles. Consequently, at least for a subset of the plurality of autonomous vehicles, information about deviations of their respective current vehicle states from respective setpoint states is obtained. The method further comprises determining a handling order in a service station based on at least one selection criterion and the information about the deviations of the current vehicle states from the setpoint state. It is therefore possible to enable prioritization of the repair of the plurality of vehicles. The selection criterion can comprise, for example, a prioritization of the handling according to the severity of the deviation of the current state of the vehicle from the setpoint state. It is thus possible, for example, for various deviations from the setpoint state to be graded into different classes for the handling priority, and accordingly for vehicles in one class to be handled in a manner prioritized over vehicles in another class. Moreover, the method comprises sending a message to at least one of the plurality of autonomous vehicles, wherein the message comprises information about the handling order by the service station. The message can be sent, for example, by a cellular network or a local wireless network (for example, in accordance with the standard IEEE 802.11p). By the information contained in the message, the one autonomous vehicle can, for example, find out a service time for itself. Accordingly, the autonomous vehicle can travel autonomously to the service station, to arrive there promptly at the service time. When the one autonomous vehicle is, for example, a driverless taxi, it can decide, for example, whether it can take on further journey bookings or in which area it can take on further journey bookings. The service station can thus carry out handling of the autonomous vehicles that is adapted to the deviations of their respective current vehicle states from respective setpoint states. It is thus possible to minimize a turnaround time of the autonomous vehicles at the service station during which they are not available for normal use. The service station can also plan the required work outlay and the required logistics better. On account of the transmission of information about the deviation of the current vehicle state from the setpoint state for at least a portion of the plurality of autonomous vehicles, the service station can order, for example, in advance parts that are (likely to be) required for the repair of the autonomous vehicles. It is thus possible to avoid a delay of the repair on account of missing parts and the unnecessary stocking of the service station with parts. It is thus possible to increase the efficiency of the repair for the plurality of autonomous vehicles.

In some exemplary embodiments, the determination of the handling order in the service station can therefore also be further based on information about a planned future use of the portion of the plurality of autonomous vehicles. The determination of the handling order can thus also take into account the already planned future use of the autonomous vehicles. It is thus possible for autonomous vehicles for which no use is planned at a specific time to be repaired at this time, whereas vehicles for which a use is planned at this time can be repaired at times at which there is no use planned (yet). It is thus possible to maximize the use possibility of the autonomous vehicles.

It is self-evident that exemplary embodiments also comprise a program with a program code for executing one of the methods described herein, when the program code runs or is executed in a data processing installation (for example, a computer cloud, a computer, a processor or a programmable hardware component).

FIG. 1 shows a method 100 for a data processing installation for obtaining an operating state of a first autonomous vehicle. The method 100 comprises in this case determining 102 a current state of the first autonomous vehicle from a received measurement value of a sensor of a second vehicle. When the current state of the first autonomous vehicle deviates from a setpoint state, the method 100 comprises sending 104a a first message to the first autonomous vehicle. In this case, the first message contains a command to travel autonomously to a service location. As an alternative, the method 100 comprises sending 104b a second message to a person responsible for the first autonomous vehicle. In this case, the second message comprises information about the deviation of the current state of the first autonomous vehicle from the setpoint state. As a further alternative, the method 100 comprises sending 104c a third message to service personnel, wherein the third message contains an instruction for the service personnel to set the vehicle to the setpoint state.

In the first alternative, the method 100 enables the first autonomous vehicle to travel autonomously in public traffic to the service location, to be examined more closely or to be set back to the setpoint state there. By the alternative sending of the second message, the person responsible can be informed of the state of the first autonomous vehicle by the method 100. The person can act on the current vehicle state according to his wishes. By the alternative sending of the third message to the service personnel, the deviation of the current vehicle state from the setpoint state can be rectified by the service personnel.

Further details of the method are described above in connection with one or more exemplary embodiments. The method can comprise one or more optional features in accordance with one or more of the above-described exemplary embodiments.

For example, the camera of a vehicle can be used with support from a back end (for example, a fleet operator or a mobility provider) for assessing the degree of soiling. It is likewise also possible to perform an assessment according to the damage criterion (for example, parking damage such as scratches and dents). In other words: the vehicles of a fleet (for example, of a taxi company) or the vehicles connected to a common back end are used to assess one another. For example, two vehicles driving past one another can use their cameras to record suitable images that are accordingly evaluated by image processing algorithms. Deviations from a setpoint state can be identified and classified according to a criteria catalog. According to the result, cleaning measures and/or repair measures can be initiated and/or the next assessment can be planned.

Figure 2:
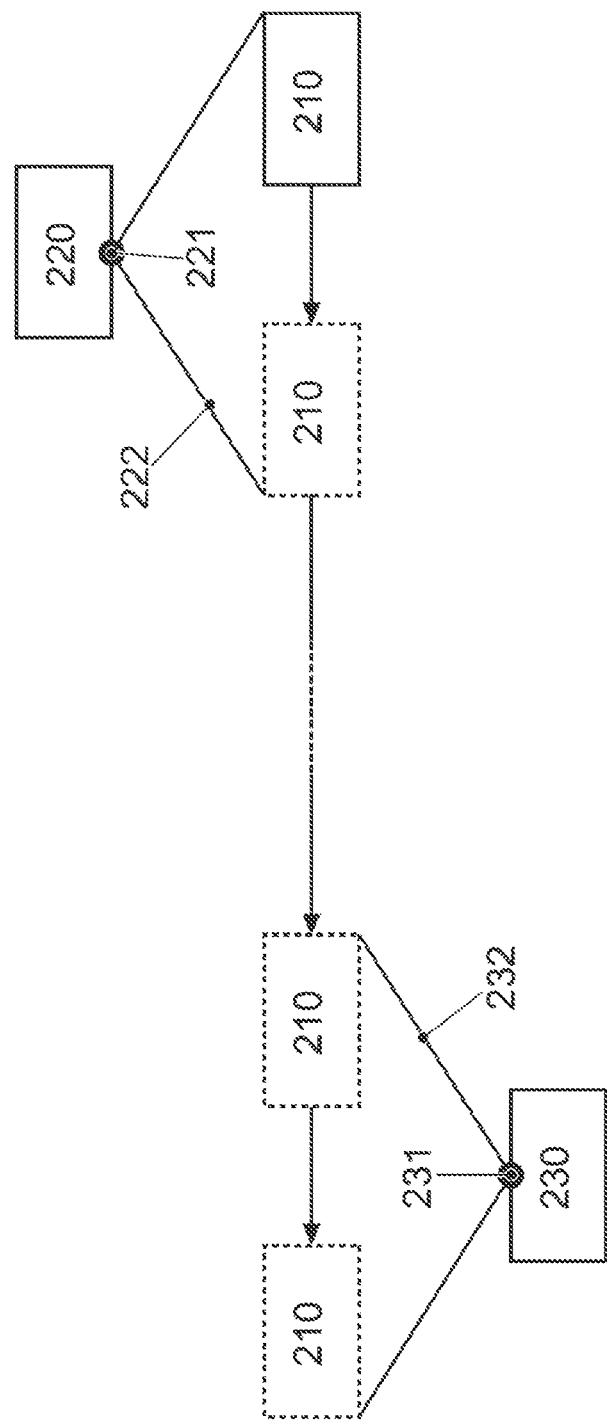
FIG. 2 shows an exemplary embodiment of a determination of a current state of a first autonomous vehicle.

Since not all sides of a vehicle can usually be seen or recorded by the respectively other vehicle when driving past, the back end can assign the images recorded by different vehicles to a vehicle that is to be assessed. The back end then performs image evaluation and assessment. For example, the up-to-dateness of the recordings can also be taken into account here. A situation of this kind is illustrated in FIG. 2.

The first autonomous vehicle 210 travels—as indicated by the arrows and the dashed illustration—along a road from right to left. Here, the first autonomous vehicle 210 first passes the second (autonomous or non-autonomous) vehicle 220. The vehicle 220 can, for example, be parked on the side of the road or be traveling in a second lane of the road in or counter to the driving direction of the first autonomous vehicle 210. The second vehicle is fitted with an optical sensor, namely a camera 221. The camera can be a camera that is already installed within the context of a driving assistance system or an autonomous driving system. In this case, the camera has an aperture angle 222, that is to say the camera 221 can make recordings of objects within the aperture angle 222. When the first autonomous vehicle 210 drives past the second vehicle 220, the camera 221 now makes a plurality of recordings of the first autonomous vehicle 210. As indicated in FIG. 2, the camera 221 can make recordings of the right side and of the rear of the first autonomous vehicle 210, for example.

The second vehicle 220 then sends the recordings to a central data processing installation (back end), where the recordings are first assigned to the first autonomous vehicle 210 (for example, based on the knowledge of the position of the first autonomous vehicle 210) and are then assessed.

Over the course of its journey along the road, the first autonomous vehicle 210 also travels past the third (autonomous or non-autonomous) vehicle 230 at a later time. The third vehicle 230 is likewise fitted with a camera 231, which has an aperture angle 232. When the first autonomous vehicle 210 drives past the third vehicle 230, the camera 231 now makes a plurality of recordings of the first autonomous vehicle 210. As indicated in FIG. 2, the camera 231 can make recordings of the left side and of the front of the first autonomous vehicle 210, for example.

The third vehicle 230 also then sends the recordings to the back end, where the recordings are first assigned to the first autonomous vehicle 210 and are then assessed. The assessment of the first autonomous vehicle 210, that is to say the determination of whether there is a deviation of the current state of the first autonomous vehicle 210 from a setpoint state, is thus carried out on the basis of the recordings from a plurality of vehicles. The back end can thus identify, for example, a degree of soiling of the first autonomous vehicle 210 or damage to the first autonomous vehicle 210.

In accordance with the method 100 or one or more of the above-described exemplary embodiments, the back end can now, for example, provide information to a person responsible for the first autonomous vehicle 210, who can command the first autonomous vehicle 210 to travel to a service location or can instruct service personnel to repair or maintain the first autonomous vehicle 210.

To improve the process reliability, the back end can also send targeted requests for driving maneuvers to a vehicle for the image quality and completeness of the recordings to be ensured (suitable distance, complete visibility, illumination of the scene to be recorded). For example, a journey trajectory for the first autonomous vehicle 210 relative to the second vehicle 220 or the third vehicle 230 can be determined in accordance with one or more of the above-described exemplary embodiments. The back end can also plan the procedures for assessing the soiling, that is to say that, in addition to random instances of driving past that arise from the routes to be driven, targeted instances of driving past can be arranged in such a way that a vehicle is viewed by a plurality of other vehicles simultaneously and a complete assessment is immediately possible. The first autonomous vehicle 210 can therefore drive past the second vehicle 220 and the third vehicle 230 not just in random state. Instead, the back end can also determine a journey route for the first autonomous vehicle 210, the journey route leading the first autonomous vehicle 210 past the second vehicle 220 and the third vehicle 230.

As already indicated in a plurality of the above-described exemplary embodiments, the vehicle taking the recordings can also be commanded in a targeted manner by the back end to travel along a journey trajectory or a route alongside a position of the vehicle that is to be assessed. When the vehicle that is to be assessed is, for example, a driverless taxi that is currently waiting at a taxi rank for a passenger, the back end can prompt one or more vehicles to drive past the driverless taxi so that sufficient recordings are available for an assessment.

The back end can thus enable support of the vehicles in the mutual recording of images (for example, photographs or moving images), assignment of the images to the individual vehicles, assessment of the degree of soiling, management of the images and assessment results, planning of the recording of the assessment images, planning of the cleaning in coordination with the use plan or driving plan of the individual vehicles, booking of the cleaning (including times) in a car wash, optionally in a car wash for autonomous vehicles, and monitoring of the vehicle washing (for example, registration at the car wash by the vehicle on-site, joining the queue, beginning of the wash, end of the wash). In the case of damage being detected, instead of planning the cleaning, planning the appraisal of the damage would be carried out, for example, in the workshop with the aim of subsequently deciding on the further approach (for example, flattening dents, paint repair, parts repair).

Figure 3:
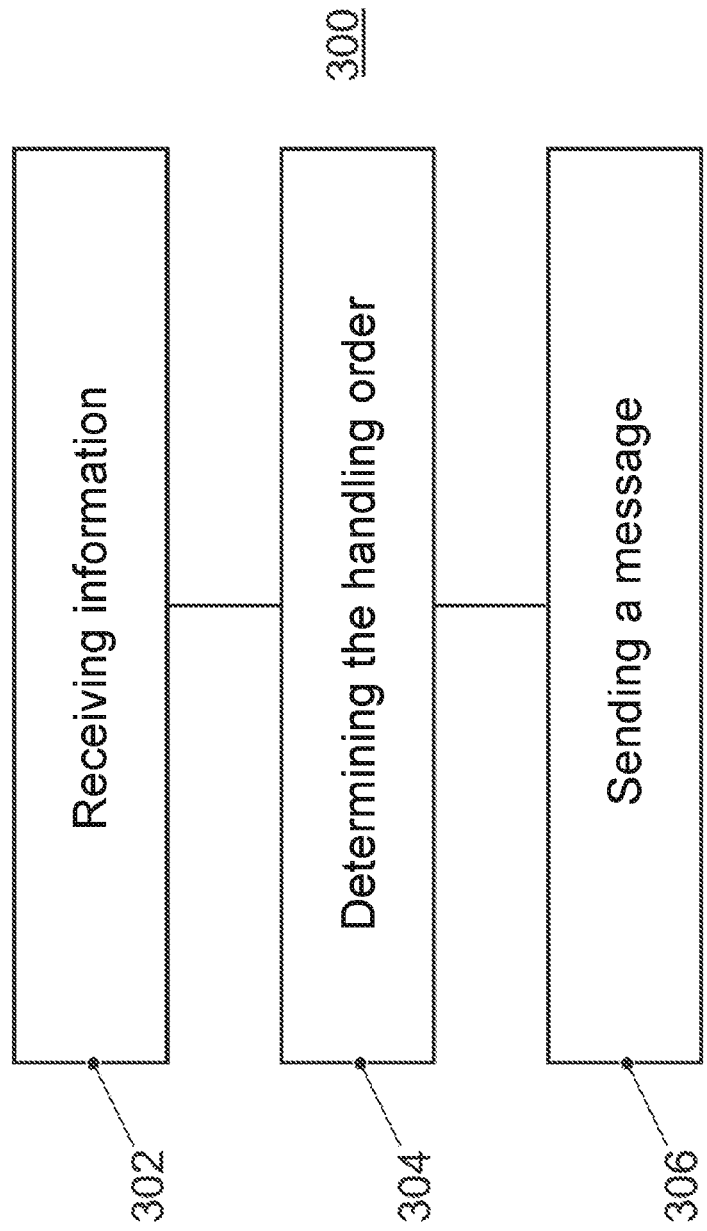
FIG. 3 shows a flowchart of an exemplary embodiment of a method for a data processing installation for managing a plurality of autonomous vehicles.

FIG. 3 now also further shows a method 300 for a data processing installation for managing a plurality of autonomous vehicles. The method 300 comprises receiving 302 information about a deviation of a current vehicle state from a setpoint state for at least a portion of the plurality of autonomous vehicles. The method 300 further comprises determining 304 a handling order in a service station based on at least one selection criterion and the information about the deviations of the current vehicle states from the setpoint state. The method 300 also comprises sending 306 a message to at least one of the plurality of autonomous vehicles, wherein the message comprises information about the handling order by the service station.

By the information contained in the message, the one autonomous vehicle can, for example, find out a service time for itself. Accordingly, the autonomous vehicle can travel autonomously to the service station, to arrive there promptly at the service time. It is thus possible to minimize a turnaround time of the autonomous vehicles at the service station during which they are not available for normal use. The service station can also plan the required work outlay and the required logistics better. It is thus possible to avoid a delay of the repair on account of missing parts and the unnecessary stocking of the service station with parts. It is thus possible to increase the efficiency of the repair for the plurality of autonomous vehicles.

Further details of the method are described above in connection with one or more exemplary embodiments. The method can comprise one or more optional features in accordance with one or more of the above-described exemplary embodiments.

LIST OF REFERENCE SYMBOLS

100 Method for a data processing installation for obtaining an operating state of a first autonomous vehicle
102 Determining a current state of the first autonomous vehicle
104a Sending a first message to the first autonomous vehicle
104b Sending a second message to a person responsible for the first autonomous vehicle
104c Sending a third message to service personnel
210 First autonomous vehicle
220 Second vehicle
221 Camera
222 Aperture angle of the camera 230 Third vehicle
231 Camera
232 Aperture angle of the camera
300 Method for a data processing installation for managing a plurality of autonomous vehicles
302 Receiving information
304 Determining a handling order in a service station
306 Sending a message to at least one of the plurality of autonomous vehicles

The invention claimed is:

1. A method comprising:
collecting a measurement value of a first vehicle with a sensor of a second vehicle, the first and second vehicles being autonomous vehicles;
transmitting the measurement value to a central data processing installation;
determining a current state of the first vehicle from the received measurement value by the central data processing installation;
in response to the current state of the first vehicle deviating from a setpoint state, sending a first message from the central data processing installation to the first vehicle;
determining a journey trajectory for the second autonomous vehicle based on a position of the first autonomous vehicle, wherein the position of the first autonomous vehicle relative to the journey trajectory satisfies a prescribed quality criterion; and
sending a second message to the second autonomous vehicle,
wherein the first message contains a command to travel autonomously to a service location, and
wherein the second message contains information about the journey trajectory and a command to travel along the journey trajectory and in the process to send recorded measurement values of the sensor to the data processing installation.

2. The method of claim 1, wherein the measurement value of the sensor of the second vehicle is a recording from a camera.

3. The method of claim 1, wherein the determination of the current state of the first autonomous vehicle is further based on a measurement value of a sensor of a third vehicle.

4. The method of claim 1, further comprising determining a service time based on a planned future use of the first autonomous vehicle, and wherein the first message comprises information about the service time.

5. The method of claim 1, wherein the service location is a service station, and the method further comprises selecting the service station from a plurality of service stations based on a position of the first autonomous vehicle.

6. A method comprising:
collecting a measurement value of a first vehicle with a sensor of a second vehicle, the first and second vehicles being autonomous vehicles;
transmitting the measurement value to a central data processing installation;
determining a current state of the first vehicle from the received measurement value by the central data processing installation;
in response to the current state of the first vehicle deviating from a setpoint state, sending a first message from the central data processing installation to the first vehicle;
determining a journey route for the second autonomous vehicle based on a position of the first autonomous vehicle, wherein the journey route leads past the position of the first autonomous vehicle; and
sending a second message to the second autonomous vehicle,
wherein the first message contains a command to travel autonomously to a service location, and
wherein the second message contains information about the journey route and a command to travel autonomously along the journey route and a command to send measurement values of the sensor recorded within a prescribed radius around the position of the first autonomous vehicle to the data processing installation.

7. A method comprising:
collecting a measurement value of a first vehicle with a sensor of a second vehicle, the first and second vehicles being autonomous vehicles;
transmitting the measurement value to a central data processing installation;
determining a current state of the first vehicle from the received measurement value by the central data processing installation;
in response to the current state of the first vehicle deviating from a setpoint state, sending a first message from the central data processing installation to the first vehicle;
determining a journey route for the first autonomous vehicle based on a position of the second vehicle, wherein the journey route leads past the position of the second vehicle;
sending a second message to the first autonomous vehicle; and
sending a third message to the second vehicle, when the first autonomous vehicle is traveling along the journey route within a prescribed radius around the position of the second vehicle,
wherein the first message contains a command to travel autonomously to a service location,
wherein the second message contains information about the journey route and a command to travel autonomously along the journey route; and
wherein the third message contains a command to send recorded measurement values of the sensor to the data processing installation.

8. The method of claim 1, further comprising assigning a received measurement value of the sensor of the second vehicle to the first autonomous vehicle.

9. The method of claim 1, wherein the setpoint state is based on a threshold level of a functional characteristic.

10. The method of claim 9, wherein the functional characteristic includes at a least one of tire inflation, operability of vehicle lights, and a structural condition of a vehicle body.

11. The method of claim 1, wherein the setpoint state is based on a threshold level of an aesthetic characteristic.

12. The method of claim 11, wherein the aesthetic characteristic is a cleanliness of a vehicle exterior.

13. The method of claim 6, wherein the measurement value of the sensor of the second vehicle is a recording from a camera.

14. The method of claim 6, further comprising determining a service time based on a planned future use of the first autonomous vehicle, and wherein the first message comprises information about the service time.

15. The method of claim 6, wherein the service location is a service station, and the method further comprises selecting the service station from a plurality of service stations based on a position of the first autonomous vehicle.

16. The method of claim 6, further comprising assigning a received measurement value of the sensor of the second vehicle to the first autonomous vehicle.

17. The method of claim 6, wherein the setpoint state is based on a threshold level of a functional characteristic including at a least one of tire inflation, operability of vehicle lights, and a structural condition of a vehicle body.

18. The method of claim 6, wherein the setpoint state is based on a threshold level of an aesthetic characteristic.

19. The method of claim 18, wherein the aesthetic characteristic is a cleanliness of a vehicle exterior.

20. The method of claim 7, wherein the measurement value of the sensor of the second vehicle is a recording from a camera.

21. The method of claim 7, further comprising determining a service time based on a planned future use of the first autonomous vehicle, and wherein the first message comprises information about the service time.

22. The method of claim 7, wherein the service location is a service station, and the method further comprises selecting the service station from a plurality of service stations based on a position of the first autonomous vehicle.

23. The method of claim 7, further comprising assigning a received measurement value of the sensor of the second vehicle to the first autonomous vehicle.

24. The method of claim 7, wherein the setpoint state is based on a threshold level of a functional characteristic including at a least one of tire inflation, operability of vehicle lights, and a structural condition of a vehicle body.

25. The method of claim 7, wherein the setpoint state is based on a threshold level of an aesthetic characteristic.

26. The method of claim 25, wherein the aesthetic characteristic is a cleanliness of a vehicle exterior.

* * * * *